United States Patent [19]

Koehler et al.

[11] Patent Number: 4,578,324

[45] Date of Patent: Mar. 25, 1986

[54] ACTIVE COOLING SYSTEM FOR ELECTROCHEMICAL CELLS

[75] Inventors: Charles W. Koehler, Fremont; Gerrit van Ommering, San Francisco, both of Calif.; Neil H. Puester, Aurora, Colo.

[73] Assignee: Ford Aerospace & Communications Corporation, Detroit, Mich.

[21] Appl. No.: 658,015

[22] Filed: Oct. 5, 1984

[51] Int. Cl.[4] .............................................. H01M 8/04
[52] U.S. Cl. ........................................ 429/26; 429/27; 429/34
[58] Field of Search ................... 429/26, 27, 34, 38, 429/39, 72, 120, 210

[56] References Cited

U.S. PATENT DOCUMENTS

| | | | |
|---|---|---|---|
| 3,880,670 | 4/1975 | Shinn | 429/38 |
| 4,098,962 | 7/1978 | Dennison | 429/72 |
| 4,101,718 | 7/1978 | Tamura et al. | 429/26 |
| 4,115,630 | 9/1978 | Van Ommering et al. | 429/72 |
| 4,189,527 | 2/1980 | Stadnick et al. | 429/26 |
| 4,192,906 | 3/1980 | Maru | 429/26 X |
| 4,233,369 | 11/1980 | Breault et al. | 429/26 |
| 4,310,605 | 1/1982 | Early et al. | 429/26 X |
| 4,342,816 | 8/1982 | Kothmann et al. | 429/13 |
| 4,397,918 | 8/1983 | Chi | 429/26 |
| 4,407,904 | 10/1983 | Uozumi et al. | 429/26 |
| 4,444,851 | 4/1984 | Maru | 429/26 |

*Primary Examiner*—Anthony Skapars
*Attorney, Agent, or Firm*—Edward J. Radlo; Robert D. Sanborn

[57] ABSTRACT

An active cooling system (40, 41) for cooling electrochemical cells (11) that are arranged in a stack (9) in a fuel cell or battery (3). The cooling system (40, 41) comprises cooling panels (15, 16) carrying a cooling fluid that flows adjacent to, and parallel to the plane of, each cell (11). The rate of cooling fluid flow past each cell (11) is made to be substantially equal, so that each cell (11) experiences substantially the same cooling environment, adding to the longevity of the fuel cell or battery (3). This can be accomplished by equalizing the resistance to cooling fluid flow for each cooling path (12), e.g., by using pressure equalizing, monotonically increasing sized orifices (28) in an input manifold (25). Dual cooling panels (15, 16) are preferably employed, in a counterflow mode. The panels (15, 16) may be divided into parallel channels (33). Heat pipe panels (35) containing a two-phase fluid may be used in lieu of panels (15, 16) that contain cooling fluid in a single state.

9 Claims, 9 Drawing Figures

SIDE VIEW

COUNTERFLOW TEMPERATURE
DISTRIBUTION
(TOP VIEW)

UNIDIRECTIONAL FLOW
TEMPERATURE DISTRIBUTION
(TOP VIEW)

TOP VIEW

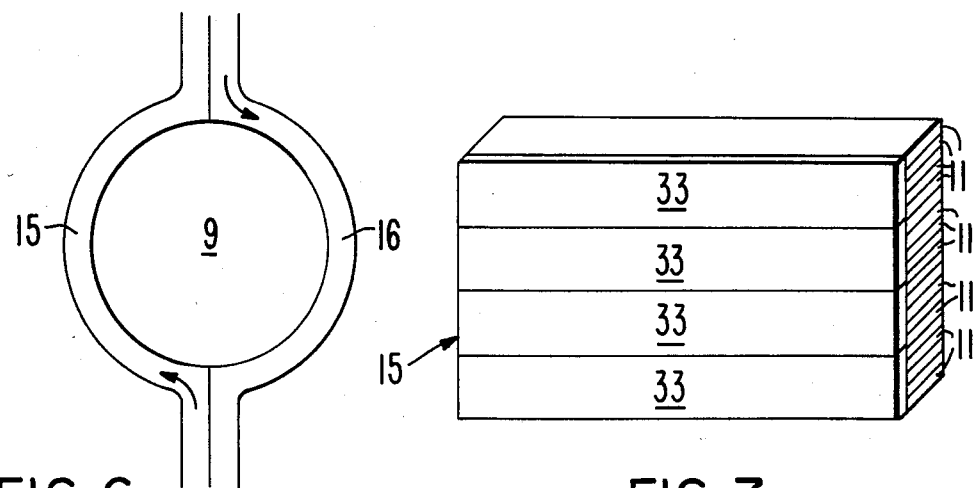
FIG. 6 TOP VIEW
FIG. 7 SIDE VIEW
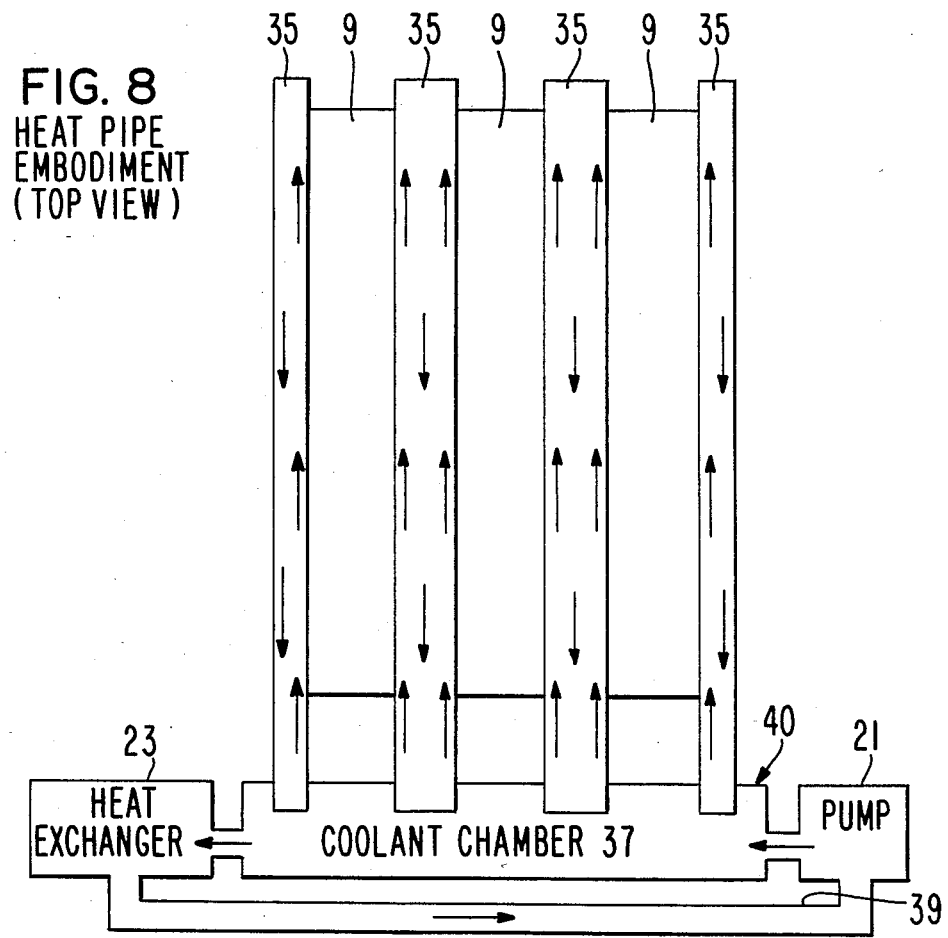
FIG. 8 HEAT PIPE EMBODIMENT (TOP VIEW)

BIPOLAR CELL CROSS SECTION

ACTIVE COOLING SYSTEM FOR ELECTROCHEMICAL CELLS

TECHNICAL FIELD

This invention pertains to the field of active systems for cooling stacked electrochemical cells, i.e., batteries or fuel cells.

BACKGROUND ART

U.S. Pat. No. 4,189,527 discloses a cooling heat pipe which is orthogonal to a stack of plates within a metal-hydrogen cell. The heat pipe makes electrical contact with all plates having one of the polarities, whereas in the present invention, the cooling means, which may be a heat pipe, is electrically insulated from the electrochemical cells in the stack. The reference cooling scheme suffers from the drawback that there is a small area of contact between each plate and the heat pipe, causing very high temperatures in the vicinity of the heat pipe. Cooling fluid is not made to flow parallel to the planes of the plates as in the present invention.

U.S. Pat. No. 4,098,962 discloses a metal-hydrogen battery in which a cooling gas is made to flow orthogonal to the stacked cells, causing cell-to-cell temperature gradients. In the present invention, on the other hand, the cooling fluid flows parallel to the planes of the cells, resulting in temperature gradients within a cell, but not cell-to-cell.

U.S. Pat. No. 4,101,718 discloses a complex fuel cell in which three coolant channels 26 direct a fluid flow orthogonal to the planes of the individual cells.

The following U.S. patents disclose fuel cells in which coolant plates are sandwiched between the cells at infrequent intervals: U.S. Pat. Nos. 3,880,670; 4,192,906; 4,233,369; 4,310,605; 4,342,816; 4,397,918; 4,407,904; and 4,444,851. This technique suffers from several drawbacks: the cells remote from the coolant plates are not cooled to the same degree as cells proximate to the coolant plates, impairing the longevity of the stack; the individual coolant plates cannot be tested without taking the entire fuel cell structure apart; and the presence, in many cases, of gas pockets, worsens the thermal conductivity in the direction orthogonal to the planes of the cells. In a stack of bipolar cells, such a system would require the use a nonconductive cooling fluid to avoid short circuits between cells, since battery current flows through the cooling plates; in the present invention, on the other hand, the cooling fluid can be conductive or nonconductive.

U.S. Pat. No. 4,115,630 discloses a metal-hydrogen battery which does not have an active cooling system.

DISCLOSURE OF INVENTION

The present invention is an active cooling system (40, 41) for simultaneously cooling each of several substantially planar electrochemcial cells (11) that are arranged in a stack (9), wherein a cooling fluid is made to flow adjacent to each cell (11), parallel to the cell's plane, through a cooling panel (15, 16) pressed against the stack (9). The rate of fluid flow past each cell (11) is substantially equalized, so that each cell (11) experiences substantially the same cooling environment. This flow equalization may be accomplished by equalizing the resistance to the fluid flow within each cooling path (12), where a cooling path (12) is defined as the round trip path taken by the cooling fluid in cooling a single cell (11). One way of accomplishing an equal resistance in each cooling path (12) is to provide an input manifold (25) coupled to the cooling panel (15, 16) by a series of orifices (28) having monotonically increasing size as the fluid traverses the manifold (25) in a direction away from a fluid pump (21).

In the preferred counterflow embodiment, two cooling panels (15, 16) are employed, whereby the fluid flows through the second panel (16) in a direction opposite to that within the first panel (15). Two or more cooling systems (40, 41) may be used, sharing a single fluid pump (21) and heat exchanger (23). The cooling panel (15, 16) may be divided into a series of parallel channels (33). Rather than using a fluid having a single state, heat pipe panels (35) using a two-phase fluid may be used instead.

BRIEF DESCRIPTION OF THE DRAWINGS

These and other more detailed and specific objects and features of the present invention are more fully disclosed in the following specification, reference being had to the accompanying drawings, in which:

FIG. 6 is a top view of an embodiment of the present invention in which curved counterflow panels 15 and 16 are used to cool a stack 9 having circular cells 11;

FIG. 7 is a side view of an embodiment of the present invention in which cooling panel 15 is divided into a series of channels 33;

FIG. 8 is a top view of an embodiment of the present invention in which heat pipe panels 35 are used between the stacks 9.

BEST MODE FOR CARRYING OUT THE INVENTION

The invention described herein has applicability to cooling any stack 9 of electrochemical cells 11 in which minimization of temperature gradient from cell to cell is important to the life and performance of the stack 9. As used throughout this specification and claims, an "electrochemical cell" is a device which uses chemicals to generate electricity in a direct conversion process. Examples of electrochemical cells are batteries 3 and fuel cells.

Figure 1:
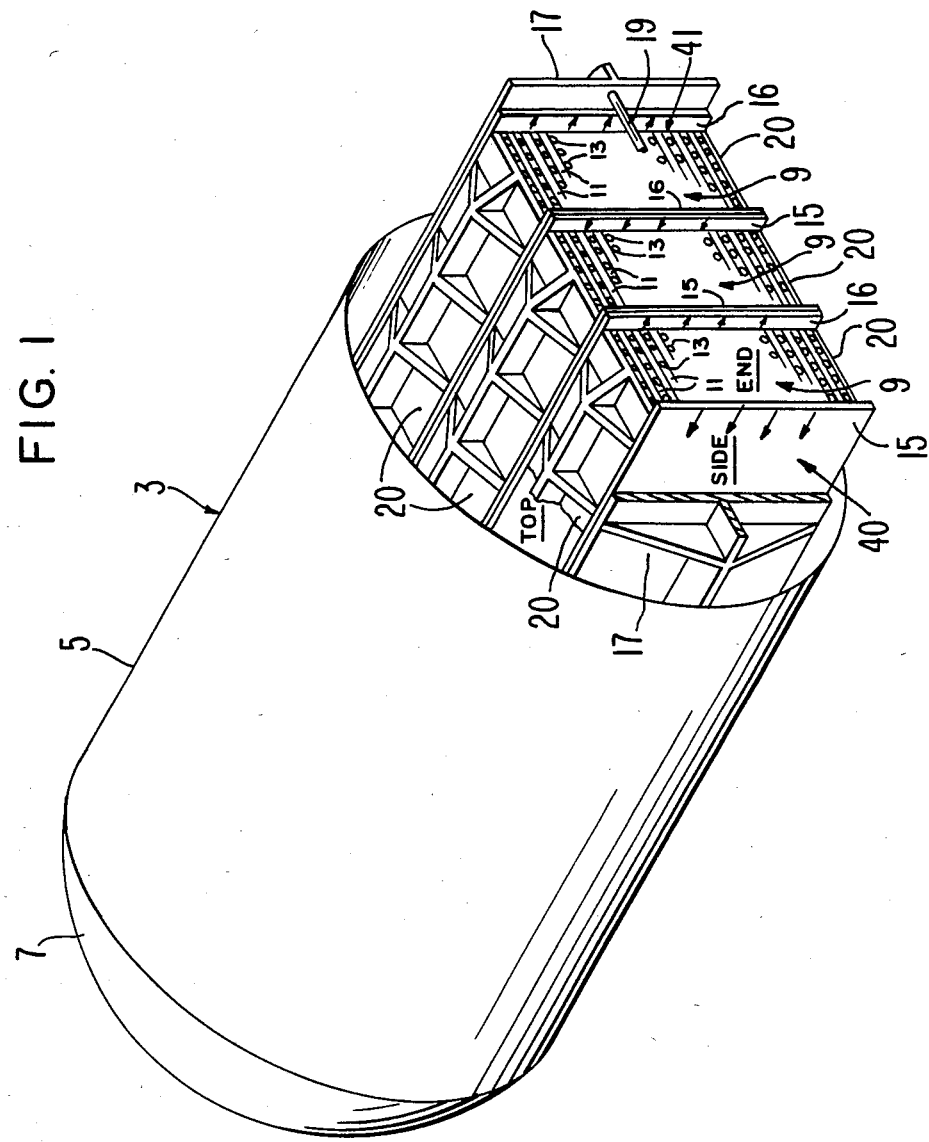
FIG. 1 is an isometric, partially broken-away view of a metal-gas battery 3 utilizing the present invention. The "side", "top", and "end" of a stack 9 are defined on FIG. 1. These orientations are referred to in the descriptions of the other FIG.s, infra.

FIG. 1 illustrates a bipolar metal-gas, e.g., nickel-hydrogen, battery 3, comprising three parallel stacks 9 of substantially planar bipolar cells 11 within a pressurized cylindrical vessel 5 terminating at each end in a domed end cap 7. The planes of the cells 11 are parallel to the surface labeled "top" in FIG. 1. Such a bipolar battery 3, when designed for large scale energy storage, generates significant amounts of heat within the cell stack 9, by stack resistive losses, charging/discharging inefficiencies due to oxygen generation and electrode polarization, and the exothermic oxygen-hydrogen gas recombination on overcharge. The cooling systems (40, 41) described herein remove this heat reliably and safely.

Rigid top and bottom structural plates 20 apply compressive force on the top and bottom of each stack 9 to reduce the resistive losses of the bipolar electrical connections between cells 11. Cooling panels 15, 16 (associated with cooling systems 40 and 41, respectively) are interspersed between the stacks 9 and are pressed firmly thereagainst by means of side support brackets 17 and compression rods 19, so that good thermal conductivity is maintained between cells 11 and a cooling fluid that flows within the panels 15, 16. The cooling fluid may be any suitable cooling means such as Freon, water, glycol, or antifreeze. In all embodiments described herein except for the FIG. 8 embodiment, the cooling fluid exists in a single state, either liquid or gas, preferably liquid.

The interior of vessel 5 not occupied by the illustrated components is filled with a reactant gas, e.g., hydrogen, which communicates with the interiors of the cells 11 by means of holes 13 through ends thereof. Cooling manifolds 25, 27; cooling pipes 29-32; cooling and electrical feedthroughs; voltage and pressure indicators; and electrical bus bars between stacks 9 are not shown in FIG. 1, for purposes of clarity.

Figure 2:
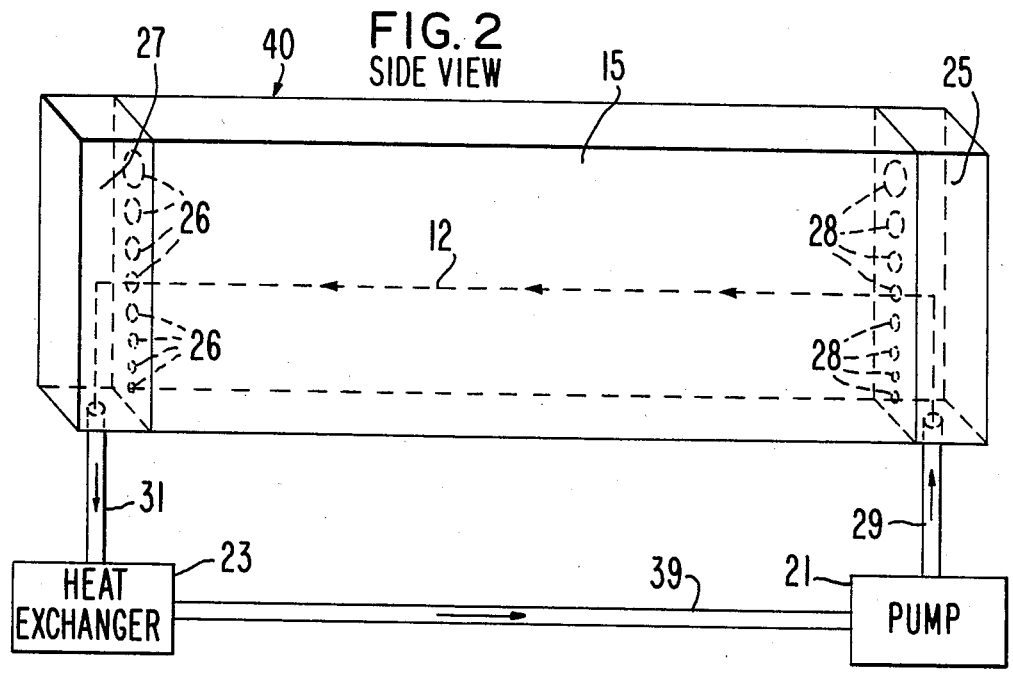
FIG. 2 is a side view of a preferred embodiment of cooling panel 15 of the present invention.

The cooling fluid is made to flow adjacent to each cell 11 within the panels 15, 16 in a direction parallel to the planes of the cells 11. (Throughout the Figures, arrows refer to the direction of cooling fluid flow.) This parallel flow draws heat out of the cells 11 through the plane of each cell 11. Furthermore, the cooling fluid is made to flow past each cell 11 at substantially the same rate to insure that each cell 11 experiences substantially the same cooling environment. One means of accomplishing this is to equalize the resistance to the cooling fluid flow through each cooling path 12. A cooling path 12 is defined as that round trip path taken by the cooling fluid to cool one particular cell 11. FIG. 2 illustrates an arbitrary cooling path 12, which starts from fluid pump 21, and progresses through input pipe 29, a portion of input manifold 25, cooling panel 15, a portion of output manifold 27, output pipe 31, heat exchanger 23, and return pipe 39 back to pump 21. Heat exchanger 23 disposes of excess heat generated by the electrochemical stacks 9 at a region remote therefrom. Heat exchanger 23 may comprise a refrigerator, radiator, fan, cooling fins, or any other means of disposing of waste heat.

Pipes 29-32, 39; manifolds 25, 27; and panels 15, 16 are preferably fabricated of metal rather than nonmetallic materials such as plastic, because of better thermal conductivity and greater ease in forming reliable mechanical joints.

While the cooling panels 15, 16 do not come in contact with the corrosive electrolyte of the battery 3 during normal operations, panels 15, 16 are preferably made of non-corrosive materials, i.e., stainless steel or nickel, or protected with an anti-corrosive coating material, to shield them from exposure to the electrolyte during activation, testing, and operation of the battery 3.

Figure 9:
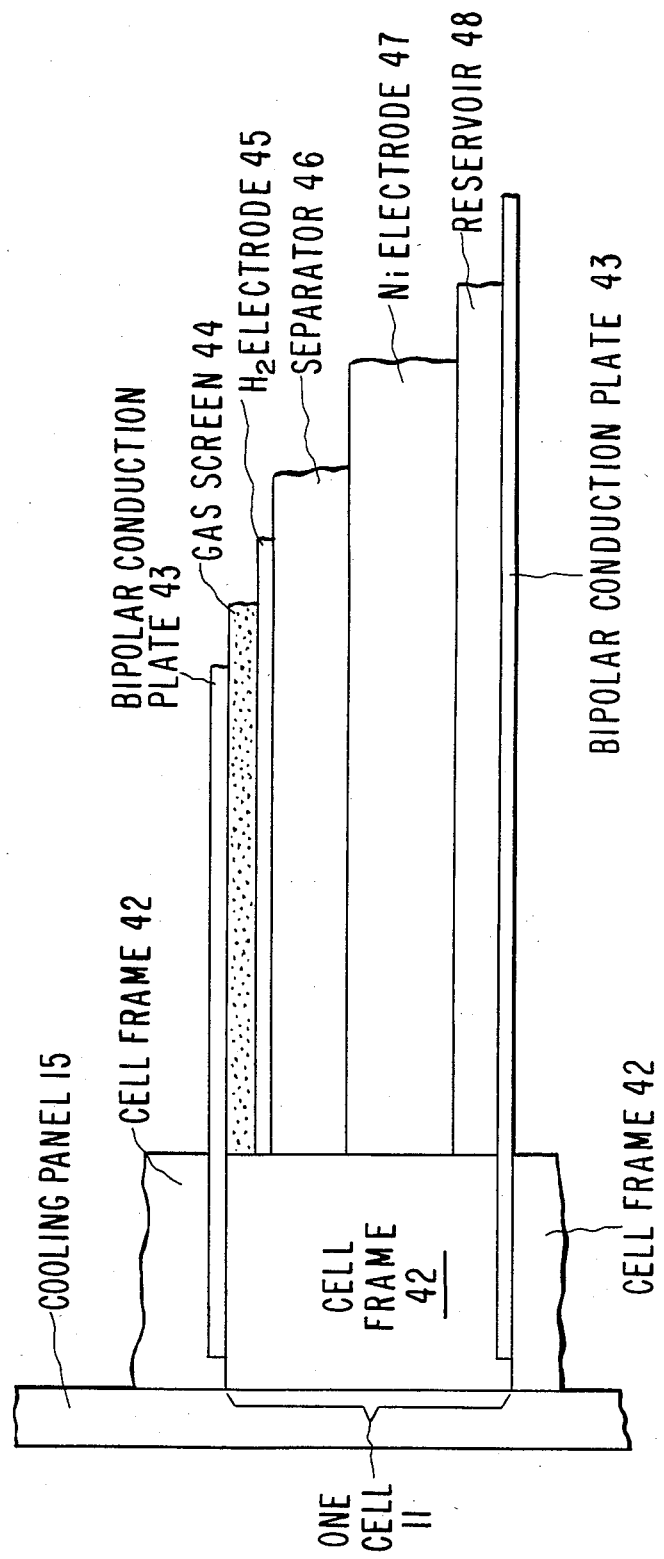
FIG. 9 is an interior view within a stack 9, along the "end" orientation, showing details of construction of the left hand portion of a cell 11.

All elements of the cooling systems 40, 41 are electrically insulated from the cell components 44-48 by means of a cell encasement frame 42 (FIG. 9). In a bipolar battery 3, the stack 9 utilizes a bipolar conduction plate 43 (typically fabricated of nickel foil) for electrical conduction from one cell 11 to another. The thermal path from the cell components 44-48 to the panels 15, 16 through the cell frame 42 is improved by extending the bipolar nickel foil 43 into the frame 42. The thermal path can also be improved by increasing the foil 43 thickness, but this entails a weight penalty, which may be important, e.g., for spacecraft applications.

One way of equalizing the resistances in all cooling paths 12 is to equalize the fluid pressures therethrough. This may be accomplished by providing input and output manifolds 25, 27 at the ends of each panel 15, 16, and positioning a series of orifices 28 in a common wall separating the input manifold 25 from the cooling panel 15, 16, as illustrated in FIG. 2. Panel 15, 16 can be channelized (see FIG. 7) or a single hollow rectangular prism throughout which cooling fluid is free to flow. The number of orifices 28 need not equal the number of cells 11 in the associated stack 9. To substantially equalize the fluid pressures for all cooling paths 12, the orifices 28 are made monotonically increasingly bigger as the fluid moves away from the direction of pump 21, to compensate for the drops in pressure caused by cooling fluid exiting manifold 25 from those orifices 28 closer to pump 21. Output manifold 27 also communicates with panel 15 by means of orifices (26), which may or may not be equal in size depending upon the degree of variation in the sizes of orifices 28.

Alternatively, equal fluid flow rates may be accomplished by building guides internal to input manifold 25 to gradually fan out the flow from pipe 29 into the panel 15 profile.

Figure 3:
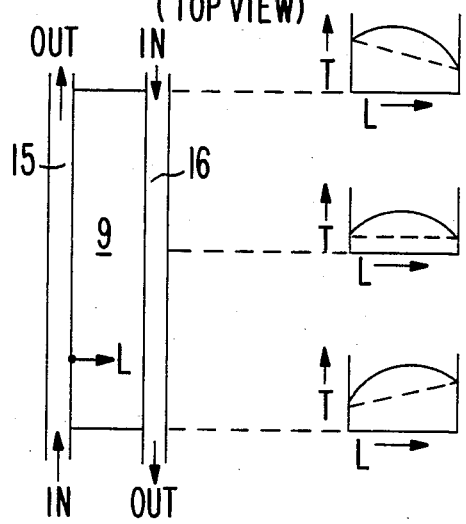
FIG. 3 is a top view of a stack 9 showing counterflow cooling panels 15, 16 of the present invention, with corresponding intracellular temperature gradients.

FIG. 3 shows a preferred embodiment in which two cooling panels 15 and 16 are used to cool each stack 9. In this embodiment, each cell 11 has a rectangular shape in its plane; this shape makes fabrication of the stacks 9 and cell components 44-48 easier. A first cooling panel 15 is pressed against a first long side of each cell 11 in the stack 9, and a second cooling panel 16 is pressed against the other long side of each cell 11 in the stack 9. Cooling fluid within each of the panels 15, 16 flows parallel with the planes of the cells 11 as before, but in opposite directions as illustrated, resulting in each cell 11 experiencing the illustrated distributions of temperature (T) versus L, the linear measurement across the short dimension of each cell 11. Three such temperature distributions are shown, corresponding to three different points along the long dimension of each cell 11.

Figure 4:
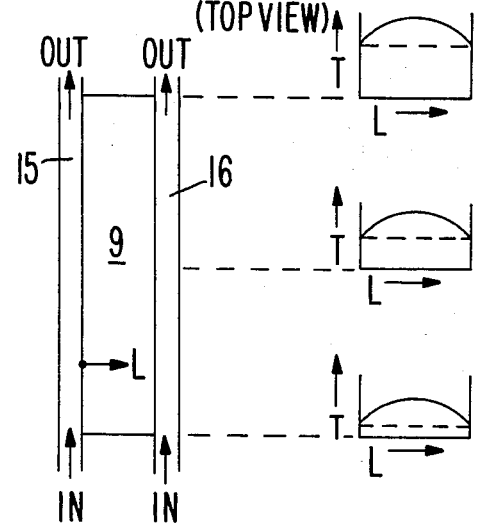
FIG. 4 is a top view of a stack 9 illustrating the temperature gradients which would occur if counterflow were not employed.

If this technique of counterflow were not employed, the temperature distributions illustrated in FIG. 4 would obtain. FIG. 4 is identical to FIG. 3 except that cooling fluid is made to flow in the same direction within each of the panels 15, 16. The counterflow temperature distribution of FIG. 3 is preferable because the average temperature along the long dimension of each cell 11 is roughly the same, increasing the reliability, performance, and longevity of the cells 11.

Figure 5:
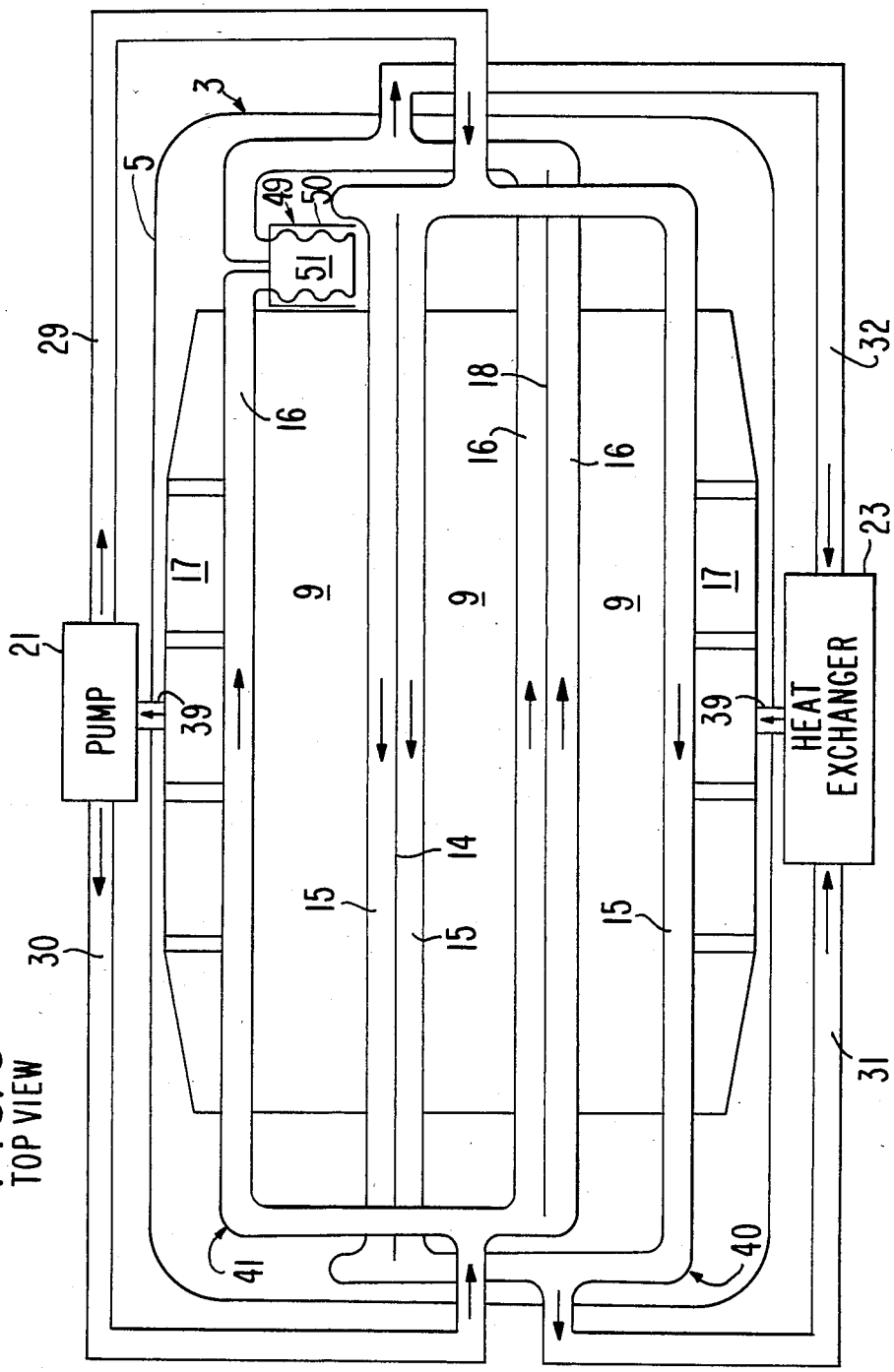
FIG. 5 is a top view of an embodiment of the present invention in which three stacks 9 are cooled by two cooling systems 40, 41.

FIG. 5 is a top view of a fuel cell or battery 3 such as that illustrated in FIG. 1, in which two cooling systems 40, 41 are used to cool three side-by-side stacks 9 of electrochemical cells 11 using the preferred counterflow technique. Such a configuration may be used for high voltage bipolar batteries 3 to best utilize the internal volume of the cylindrical pressure vessel 5. The stacks 9 are externally connected electrically, in series or parallel, using appropriate bus bars (not illustrated). The two cooling systems 40, 41 share a single pump 21 and a single heat exchanger 23, connected via a single return pipe 39. The pump 21 and heat exchanger 23 are external to the battery 3, and the cooling fluid piping 29–32 passes through the pressure vessel wall 5 via a pressure sealed feedthrough (not shown).

Cooling system 40 comprises input pipe 29, three parallel cooling panels 15, and output pipe 31. The lower, middle, and upper cooling panels 15, respectively, cool the lower, middle, and upper stacks 9, respectively. Cooling fluid flow in each of panels 15 is in the same direction. For the sake of convenience, upper panels 15 share a common wall 14.

Similarly, cooling system 41 comprises input pipe 30, three parallel cooling panels 16, and output pipe 32. The lower, middle, and upper cooling panels 16, respectively, cool the lower, middle, and upper stacks 9, respectively. Cooling fluid flow in each of panels 16 is in the same direction and is opposed to the flow in each of panels 15. The fact that pump 21 and heat exchanger 23 are common to each cooling system 40, 41 helps equalize the temperatures at the inputs 29, 30 of these systems 40, 41, helping to insure that all the cells 11 within all three stacks 9 experience substantially the same cooling environment as desired.

It is not necessary that the cooling pipes 29–32 be electrically insulated from vessel 5, because vessel 5 and cooling systems 40, 41 are electrically and ionically isolated from the components comprising the stack 9. However, compression seals of the type commonly used in present-day nickel-hydrogen battery cells could be used for cooling pipe 29–32 feedthroughs.

Pressure compensation bellows 49 can be used in a portion of pipes 29–32 internal to vessel 5. This bellows 49 automatically equalizes pipe 29–32 pressure to the internal battery 3 pressure as the battery 3 is charged and discharged. Thus, it reduces mechanical stress on pipe 29–32 joints and cooling panels 15, 16, thereby improving battery 3 reliability and decreasing weight. Additionally, it permits optimizing the shape of the pipes 29–32 and cooling panels 15, 16 for effective heat transfer rather than for withstanding high pressure differentials. Bellows 49 comprises a hollow, rigid support cylinder 50 having one end open to the gas permeating the interior of the battery 3. Within the cylinder 50 is a flexible bladder 51 containing the cooling fluid. The bladder is free to expand and contract to equalize pressure differentials.

FIG. 6 illustrates an embodiment in which each of the substantially planar cells 11 has a circular shape in its plane. Counterflow cooling is accomplished in this embodiment by means of curving panels 15 and 16 as illustrated. Normally, the rectangular cell 11 shape illustrated in FIGS. 1–5 and 7–9 is preferable to the circular shape illustrated in FIG. 6, because it entails a simpler and less expensive geometry for manufacturing larger cell 11 sizes. The cooling system 40, 41 of the present invention is sufficiently effective in most cases to permit use of this preferable rectangular geometry, even when the ends of the cells 11 are not directly cooled by panels 15, 16. Furthermore, in a rectangular cell 11 battery 3, the voltage and/or capacity can be readily changed, reducing non-recurring development costs and minimizing technical and performance risks. The thermal design of the battery 3 establishes an electrode width based on the thermal conductivity of the path between the stack 9 and the cooling panel 15, 16. This electrode width remains fixed as battery 3 electrical performance requirements change. Higher battery 3 voltage is accomplished by adding more bipolar cells 11 and increasing the stack 9 height and cooling panel 15, 16 height, or by creating an additional electrically series-connected substack 9. Higher capacity is accomplished by increasing cell 11 area via increased cell electrode length; the cooling panel 15, 16 length is increased accordingly. Higher capacity can also be obtained by creating an additional electrically parallel-connected substack 9. In either case, the pumped fluid flow rate is increased to carry away the additional heat, resulting in similar inter-cell and intra-cell temperature gradients.

FIG. 7 illustrates an embodiment of the present invention in which cooling panel 15 has been segmented into several channels 33. This technique can increase the reliability of the fuel cell or battery 3, because the failure of one of the channels 33 will not disrupt the flow of cooling fluid through the remaining channels 33. A disadvantage of this technique is that the fabrication becomes more complex: non-channelized panels 15, 16 reduce the number of connections required, are relatively easy to match in terms of flow rate, and are simple in structure, reducing resistance to fluid flow and possibility of blockage. As a compromise, each channel 33 can be made wide enough to cool several cells 11 as illustrated.

Unlike the previous embodiments, which illustrate a single-state cooling fluid, FIG. 8 illustrates an embodiment in which heat pipe panels 35, containing a two-phase (liquid and gas) fluid, are employed between the stacks 9 in place of cooling panels 15, 16. Heat pipe panels 35 extend beyond the stacks 9 and penetrate a coolant chamber 37 located near the stacks 9. Within each heat pipe panel 35 is a wick which conveys the liquid state of the two-phase fluid within the heat pipe panel 35 to a region of relatively high temperature, whereupon the liquid form evaporates, then travels as gas within the heat pipe panel 35 to a relatively cooler region, where it condenses back into the liquid state. The relatively hot regions are adjacent stacks 9, and the relatively cool regions are near coolant chamber 37, which is cooled by means of pumping a single-state cooling fluid by means of pump 21 through chamber 37, and disposing of excess heat by means of heat exchanger 23 before returning the fluid to pump 21 via return pipe 39.

As with the previous embodiments, the two-phase fluid is made to flow parallel to the planes of the cells 11, drawing heat from the cells 11 through their planes. The FIG. 8 embodiment is more efficient than the other embodiments; however, it is more expensive. Furthermore, cooling systems 40, 41 of a single-state fluid embodiment can be pressurized to increase efficiency, whereas heat pipe panels 35 cannot.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. An active cooling system for cooling several substantially planar electrochemical cells arranged in a stack, said cooling system comprising:

means for directing a flow of cooling fluid parallel to the plane of, and adjacent to, each cell; and means for substantially equalizing the rate of flow of cooling fluid past each cell; wherein each cell experiences substantially the same cooling environment.

2. The apparatus of claim 1 wherein the electrochemical cells constitute a bipolar metal-gas battery.

3. The apparatus of claim 1 wherein the electrochemical cells constitute a fuel cell.

4. The apparatus of claim 1 wherein the cooling system further comprises:

coupled to an input of the directing means, means for pumping the cooling fluid through the directing means;

coupled to an output of the directing means, means for exchanging heat out of the cooling system; and a return pipe coupling the pumping means and the heat exchanging means; wherein the directing means comprises:

for each cell, a cooling path comprising the round trip route taken by cooling fluid to cool that cell; wherein the resistance to cooling fluid flow is substantially the same for all cooling paths.

5. The apparatus of claim 4 wherein the directing means comprises a hollow cooling panel pressed against a side of each of the cells; and an input manifold is coupled between the pump and the cooling panel, said manifold communicating with the cooling panel via several orifices that have monotonically increasing size as the fluid travels within the manifold in a direction away from the pump.

6. The apparatus of claim 1 wherein each cell has the shape of a rectangular prism having first and second long sides; and the directing means comprises first and second cooling panels; wherein one of the cooling panels is pressed against the first long side of each of the cells, and the other cooling panel is pressed against the other long side of each of the cells; and with respect to the plane of each of the cells, cooling fluid flows in opposite directions through the first and second panels.

7. The apparatus of claim 6 further comprising: several side-by-side stacks of electrochemical cells;

two sets of cooling panels pressed against the cells, each set comprising one panel for each stack;

a single pump for pumping the fluid through all the panels of both sets;

a single heat exchanger coupled to all of the panels of both sets; and a return pipe coupling the pump and the heat exchanger; whereby the temperature at the pump side of each of the panels is substantially the same.

8. The apparatus of claim 1 wherein the directing means comprises a cooling panel conveying the cooling fluid, said panel being pressed against each of the cells in the stack and comprising several channels that are parallel to each other and to the planes of each of the cells, with each said channel being pressed against at least one cell.

9. The apparatus of claim 1 wherein the directing means comprises a cooling panel that is pressed against all the cells in the stack, said panel comprising a heat pipe having a wick spread along the inner surface of the panel, whereby the cooling fluid is drawn, in a liquid state, by the wick to relatively high temperature regions within the panel, where it is evaporated into a gaseous state, and said fluid condenses into its liquid state at relatively low temperature regions within said panel.

* * * * *

UNITED STATES PATENT AND TRADEMARK OFFICE
CERTIFICATE OF CORRECTION

PATENT NO. : 4,578,324
DATED : March 25, 1986
INVENTOR(S) : Charles W. Koehler, Gerrit vanOmmering, Neil H. Puester It is certified that error appears in the above-identified patent and that said Letters Patent are hereby corrected as shown below:

Column 1, after the title insert--- The invention described herein was made in the performance of work under NASA Contract No. NAS3-23879 and is subject to the provisions of Section 305 of the National Aeronautics and Space Act of 1958, as amended (72 Stat. 435; 42 U.S.C. 2457).--

Signed and Sealed this

Fifteenth Day of July 1986

[SEAL]

Attest:

DONALD J. QUIGG

Attesting Officer

Commissioner of Patents and Trademarks